United States Patent
Takahata et al.

(10) Patent No.: US 7,820,079 B2
(45) Date of Patent: Oct. 26, 2010

(54) VEHICLE INTERIOR MATERIAL COATING COMPOSITION AND VEHICLE INTERIOR MATERIAL

(75) Inventors: Nobuyuki Takahata, Takefu (JP); Norio Nakamura, Takefu (JP); Yuji Gama, Takefu (JP); Harukazu Okuda, Takefu (JP)

(73) Assignee: Nissin Chemical Industry Co., Ltd., Tokyo (JP)

( * ) Notice: Subject to any disclaimer, the term of this patent is extended or adjusted under 35 U.S.C. 154(b) by 877 days.

(21) Appl. No.: 11/150,239

(22) Filed: Jun. 13, 2005

(65) Prior Publication Data
US 2005/0277711 A1   Dec. 15, 2005

(30) Foreign Application Priority Data
Jun. 14, 2004 (JP) .............................. 2004-175119

(51) Int. Cl.
C09K 21/04 (2006.01)
C09K 21/10 (2006.01)
C09K 21/12 (2006.01)
C09K 21/14 (2006.01)

(52) U.S. Cl. .................... 252/601; 252/610; 252/611
(58) Field of Classification Search .............. 252/601, 252/610, 611
See application file for complete search history.

(56) References Cited

U.S. PATENT DOCUMENTS

| 6,015,510 A * | 1/2000 | Jacobson et al. ............. 252/609 |
| 6,444,315 B1 * | 9/2002 | Barfurth et al. .............. 428/403 |
| 2001/0027226 A1 * | 10/2001 | Thewes et al. ............... 523/179 |
| 2003/0166817 A1 * | 9/2003 | Barfurth et al. ............... 528/10 |
| 2005/0009966 A1 * | 1/2005 | Rowen ........................ 524/115 |

FOREIGN PATENT DOCUMENTS

| EP | 1362904 | * | 9/2002 |
| EP | 1 466 946 A1 | | 10/2004 |
| JP | 9-13037 A | | 1/1997 |
| JP | 10-110083 A | | 4/1998 |
| JP | 2003-171878 A | | 6/2003 |
| WO | 03/046084 A1 | | 6/2003 |

OTHER PUBLICATIONS

Safety Data Sheet 2001/58/EG for the product Mowilith DM 1831E.

* cited by examiner

*Primary Examiner*—Gregory R Del Cotto
*Assistant Examiner*—Amina Khan
(74) *Attorney, Agent, or Firm*—Birch, Stewart, Kolasch & Birch, LLP

(57) ABSTRACT

A coating composition comprising 100 pbw as solids of a synthetic resin emulsion and 1-300 pbw of a non-halogen flame retardant in which phosphorus and nitrogen-containing non-halogen flame retardant particles are surface coated with a functional group-containing organosilicon resin is applicable to vehicle interior materials such as car seats, floor mats and ceiling members.

11 Claims, No Drawings

VEHICLE INTERIOR MATERIAL COATING COMPOSITION AND VEHICLE INTERIOR MATERIAL

CROSS-REFERENCE TO RELATED APPLICATION

This non-provisional application claims priority under 35 U.S.C. §119(a) on Patent Application No. 2004-175119 filed in Japan on Jun. 14, 2004, the entire contents of which are hereby incorporated by reference.

TECHNICAL FIELD

This invention relates to coating compositions for vehicle interior materials such as car seats, floor mats and ceiling members, and vehicle interior materials coated therewith.

BACKGROUND ART

Most coating agents applied to vehicle interior materials such as car seats, floor mats and ceiling members in the prior art are halogenated flame retardants such as decabromodiphenyl ether for imparting flame retardance. The recent concern about the environment demands to replace conventional halogenated flame retardants by non-halogen flame retardants. The non-halogen flame retardants, however, have drawbacks of poor flame retardance and poor water resistance, as compared with the halogenated flame retardants.

To overcome these problems, an attempt was made to encapsulate a water-soluble non-halogen flame retardant such as ammonium polyphosphate with a coating agent. JP-A 9-13037 discloses such a coating agent comprising a polyamide resin, acrylic resin or styrene resin although the resulting flame retardant is still less resistant to water.

JP-A 10-110083 and JP-A 2003-171878 disclose that ammonium polyphosphate particles can be admixed with acrylic emulsions in a stable manner when they are surface coated with melamine resins or the like. The emulsion compatibility is improved. However, if the coating agent has a low degree of curing, coatings applied and dried to substrates, typically fabrics are not improved in water resistance. For example, a problem has been pointed out that the coating surface becomes slimy when contacted with water. On the other hand, if the coating agent has a higher degree of curing, the above problem is overcome, but formaldehyde is detectable, raising an environmental problem.

In addition to the ammonium polyphosphate, the known non-halogen flame retardants include metal hydroxides such as is aluminum hydroxide and magnesium hydroxide and phosphate esters, which are considered less flame retardant than the halogenated flame retardants.

There exists a need for coating compositions comprising non-halogen flame retardants having physical properties comparable to coating compositions comprising conventional halogenated flame retardants.

SUMMARY OF THE INVENTION

An object of the present invention is to provide a coating composition for use with vehicle interior materials such as car seats, floor mats and ceiling members, comprising a non-halogen flame retardant, which composition has physical properties comparable to coating compositions comprising conventional halogenated flame retardants. Another object is to provide a vehicle interior material coated with the coating composition.

The inventors have found that when a certain amount of a non-halogen flame retardant in which specific non-halogen flame retardant particles are surface coated with an organosilicon resin is added to a synthetic resin emulsion, there is obtained a novel coating composition comprising a non-halogen flame retardant, which composition has physical properties comparable to coating compositions comprising conventional halogenated flame retardants. This coating composition is suitable to apply to vehicle interior materials such as car seats, floor mats and ceiling members.

Therefore, the present invention provides a coating composition for vehicle interior materials, comprising a synthetic resin emulsion and at least one non-halogen flame retardant in which phosphorus and nitrogen-containing non-halogen flame retardant particles are surface coated with a functional group-containing organosilicon resin, the at least one non-halogen flame retardant being present in an amount of 1 to 300 parts by weight per 100 parts by weight of solids of the synthetic resin emulsion. A vehicle interior material coated with the composition is also contemplated.

The coating composition comprising a non-halogen flame retardant according to the invention has physical and flame retardant properties comparable to coating compositions comprising conventional halogenated flame retardants and is thus suitable to apply to vehicle interior materials such as car seats, floor mats and ceiling members.

DESCRIPTION OF THE PREFERRED EMBODIMENTS

The coating composition of the invention for vehicle interior materials is defined as comprising a synthetic resin emulsion and a non-halogen flame retardant in which phosphorus and nitrogen-containing non-halogen flame retardant particles are surface coated with a functional group-containing organosilicon resin. The resin-coated non-halogen flame retardant is added in an amount of 1 to 300 parts by weight per 100 parts by weight of solids of the synthetic resin emulsion.

Emulsion

The synthetic resin emulsions used herein include vinyl chloride resin base emulsions, (meth)acrylate resin base emulsions, styrene/acrylate copolymer base emulsions, urethane resin base emulsions, silicone resin base emulsions, fluororesin base emulsions, epoxy resin base emulsions, ethylene/vinyl acetate copolymer base emulsions, and rubber base emulsions such as styrene-butadiene rubber (SBR) or acrylonitrile-butadiene rubber (NBR) base emulsions. These emulsions may be used alone or in admixture of two or more. Preference is given to (meth)acrylate resin base emulsions, styrene/acrylate copolymer base emulsions, urethane resin base emulsions, ethylene/vinyl acetate copolymer base emulsions, and rubber base emulsions such as SBR or NBR.

The above-listed synthetic resin emulsions may be synthesized by emulsion polymerization. Instead, any of commercially available synthetic resin emulsions be used.

Examples of commercially available synthetic resin emulsions include, but are not limited to, (meth)acrylate resin base emulsions such as Vinyblan 2598 by Nisshin Chemical Co., Ltd. and Aron A-104 by Toa Synthesis Co., Ltd.; styrene/acrylate copolymer base emulsions such as Vinyblan 2590 by Nisshin Chemical Co., Ltd. and Movinyl 975A by Clariant Polymer Co., Ltd.; urethane resin base emulsions such as Hydran HW-311 and HW-301 by Dainippon Ink & Chemicals, Inc. and Permarine UA-150 by Sanyo Chemical Industry Co., Ltd.; ethylene/vinyl acetate copolymer base emulsions such as Sumikaflex 400 and 752 by Sumitomo Chemical Co., Ltd. and Panflex OM-4000 by Kurare Co., Ltd.; and rubber base emulsions such as Nalstar SR-100 and SR-112 by Nippon A&L Inc. and Nipol 1561 by Nippon Zeon Co., Ltd.

When the foregoing synthetic resin emulsions are prepared by emulsion polymerization, radical polymerization is generally employed for synthesis. The starting monomers used are monomers containing unsaturated groups having a radical polymerization ability.

Examples of suitable unsaturated group-containing monomers include ethylene and propylene; chlorine-containing monomers such as vinyl chloride and vinylidene chloride; vinyl carboxylate monomers such as vinyl acetate and vinyl propionate; aromatic vinyl monomers such as styrene and α-methylstyrene; conjugated diene monomers such as 1,3-butadiene and 2-methyl-1,3-butadiene; ethylenically unsaturated monocarboxylic acid esters such as methyl acrylate, ethyl acrylate, butyl acrylate, 2-ethylhexyl acrylate, and methyl methacrylate; ethylenically unsaturated polycarboxylic acid esters such as dimethyl itaconate, diethyl maleate, monobutyl maleate, monoethyl fumarate, and dibutyl fumarate; ethylenically unsaturated monocarboxylic acids such as acrylic acid, methacrylic acid and crotonic acid; ethylenically unsaturated polycarboxylic acids such as itaconic acid, maleic acid, and fumaric acid; epoxy group-containing monomers such as glycidyl methacrylate; alcoholic hydroxyl group-containing monomers such as 2-hydroxyethyl methacrylate; alkoxyl group-containing monomers such as methoxyethyl acrylate; nitrile group-containing monomers such as acrylonitrile; amide group-containing monomers such as acrylic amide; amino group-containing monomers such as dimethylaminoethyl methacrylate; and monomers having at least two ethylenically unsaturated groups in a molecule such as divinyl benzene and allyl methacrylate.

For the emulsion polymerization, any well-known emulsion polymerization techniques may be employed. The foregoing monomers and polymerization aids (e.g., emulsifiers such as alkyl sulfate salts, polymerization initiators such as ammonium persulfate, chain transfer agents such as mercaptans, pH regulators such as sodium carbonate, antifoaming agents) may be added wholly at the initial, or continuously over the course. Alternatively, some of them may be added continuously or in divided portions during the polymerization.

Suitable emulsifiers used in the emulsion polymerization include surfactants of the following classes (1) to (4), which may be used alone or in admixture of two or more.

(1) Anionic surfactants, such as alkyl sulfate ester salts, polyoxyethylene alkyl ether sulfate ester salts, alkylbenzene sulfonate salts, alkyldiphenylether disulfonate salts, alkyl naphthalene sulfonate salts, fatty acid salts, dialkylsulfosuccinate salts, alkylphosphate salts, polyoxyethylene alkyl phenyl phosphate ester salts.

(2) Nonionic surfactants, such as polyoxyethylene alkyl phenyl ethers, polyoxyethylene alkyl ethers, polyoxyethylene fatty acid esters, sorbitan fatty acid esters, polyoxyethylene sorbitan fatty acid esters, polyoxyalkylene alkyl ethers, polyoxyethylene derivatives, glycerin fatty acid esters, polyoxyethylene hardened castor oil, polyoxyethylene alkyl amines, alkyl alkanol amides, or acetylene alcohol, acetylene glycol and ethylene oxide addition products thereof.

(3) Cationic surfactants, such as alkyl trimethylammonium chlorides, dialkyl dimethylammonium chlorides, alkylbenzylammonium chlorides, and alkylamine salts.

(4) Polymerizable surfactants having a double bond with a radical polymerization ability in a molecule, such as alkylallylsulfosuccinic acid salts, methacryloyl polyoxyalkylene sulfate ester salts, polyoxyethylene nonylpropenylphenyl ether sulfate ester salts.

These surfactants are generally used in amounts of 0.3 to 20% by weight, preferably 0.5 to 10% by weight based on the weight of the monomers.

Examples of the polymerization initiator used for the emulsion polymerization include persulfates such as ammonium persulfate, potassium persulfate; azo compounds such as 2,2'-diamidino-2,2'-azopropane dihydrogen chloride salt and azobisisobutyronitrile; and peroxides such as cumene hydroperoxide, benzoyl peroxide and hydrogen peroxide. Well-known redox initiators such as potassium persulfate and sodium hydrogen sulfite are also useful. The amount of the polymerization initiator used is generally 0.1 to 5% by weight, preferably 0.2 to 2% by weight based on the weight of the monomers.

The emulsion polymerization is generally conducted at a temperature of 10 to 90° C., desirably 50 to 80° C. and for a time of about 3 to about 20 hours. This polymerization is desirably conducted in an atmosphere of an inert gas such as nitrogen gas.

Flame Retardant

The flame retardant used in the coating composition of the invention is a non-halogen flame retardant in which phosphorus and nitrogen-containing non-halogen flame retardant particles are surface coated with a functional group-containing organosilicon resin.

Flame retardants containing only phosphorus include, for example, phosphoric acid esters, but are less flame retardant than the halogenated flame retardants. The inventors select as the flame retardant component a flame retardant containing both phosphorus and nitrogen for achieving an improved flame retardant effect.

Examples of the phosphorus and nitrogen-containing non-halogen flame retardant particles include guanidine phosphates, ammonium phosphates, melamine phosphates, and ammonium polyphosphates, which may be used alone or in admixture of two or more. Inter alia, ammonium polyphosphates are preferred. Useful ammonium polyphosphates are commercially available. These flame retardants are in the form of particles, preferably having an average particle size of 3 to 20 μm, especially 5 to 18 μm. It is noted that the average particle size is determined as a weight average value or median diameter, for example, using a particle size distribution analyzer relying on the laser light diffraction technique.

When surfaces of phosphorus and nitrogen-containing non-halogen flame retardant particles are coated with a functional group-containing organosilicon resin, the functional groups first adsorb and orient to the surfaces of phosphorus and nitrogen-containing non-halogen flame retardant particles so that alkyl groups in the resin are likely to orient to the surfaces, exerting good water repellency. No particular limit is imposed on the method of preparing the functional group-containing organosilicon resin. It is preferred that the functional group-containing organosilicon resin be the reaction product of a siloxane oligomer with a functional group-containing organosilicon compound because it has an increased weight average molecular weight and is effective for preventing any lowering of water solubility (or water repellency).

The siloxane oligomer used herein is typically a partial hydrolytic condensate of at least one alkoxysilane having the formula:

$$R_n Si(OR')_{4-n}$$

wherein R is a monovalent hydrocarbon group such as $C_1$-$C_6$ alkyl, R' is $C_1$-$C_4$ alkyl, n is an integer of 0 to 3, preferably a mixture of alkoxysilanes containing at least 50% by weight, more preferably at least 70% by weight of a trialkoxysilane (n=1), typically methyltrimethoxysilane, methyltriethoxysilane, or ethyltriethoxysilane, the condensate preferably containing at least one, especially at least two alkoxy groups. In the siloxane oligomer, the number of silicon atoms is preferably 2 to 10 on the average, especially 2 to 4 on the average. An alternative siloxane oligomer may be obtained by reacting a $C_1$-$C_6$ alkyltrichlorosilane with methanol or ethanol. In the alternative siloxane oligomer, the number of silicon atoms is preferably 2 to 6 on the average, especially 2 to 4 on the average. The alternative siloxane oligomer should also preferably have at least one, especially at least two alkoxy groups.

The functional group-containing organosilicon compound is typically a functional group-containing alkoxysilane having the formula:

$$X_m R_k Si(OR')_{4-m-k}$$

wherein X is an alkyl group (preferably $C_1$-$C_6$ alkyl group) having a functional group such as epoxy, vinyl, mercapto, carboxyl or amino, m is 1, 2 or 3, preferably 1, k is 0, 1 or 2, preferably 0 or 1, m+k is 1, 2 or 3, preferably 1 or 2, R and R' are as defined above, or a partial hydrolyzate thereof. The functional group on the functional group-containing organosilicon compound is typically selected from epoxy, vinyl, mercapto, carboxyl, amino and similar groups. Of these, the amino group is preferred for the intended use after dispersion in water as in the present invention.

The amino group-containing organosilicon compounds include amino group-containing alkoxysilanes and partial hydrolyzates thereof, for example, N-(2-aminoethyl)-3-aminopropyltrimethoxysilane, N-(2-aminoethyl)-3-aminopropylmethyldimethoxysilane, N-(2-aminoethyl)-3-aminopropyltriethoxysilane, 3-aminopropyltrimethoxysilane and 3-aminopropylmethyldimethoxysilane as well as partial hydrolyzates thereof.

Relative to 100 parts by weight of the siloxane oligomer, the functional group-containing organosilicon compound is preferably used in an amount of 0.5 to 50 parts by weight, especially 5 to 30 parts by weight. Too less amounts of the organosilicon compound may result in a silicone water repellent treating agent which is unstable. Too much amounts may detract from water repellency or cause substantial yellowing.

If necessary, 0.1 to 10 parts by weight of inorganic oxide fine particles such as colloidal silica and/or 0.1 to 20 parts by weight of a bis(alkoxysilyl) group-containing compound or partial hydrolyzate thereof may be added per 100 parts by weight of the siloxane oligomer.

The reaction of a siloxane oligomer with a functional group-containing organosilicon compound may be conducted by well-known techniques. The preferred reaction conditions include a temperature of about 60 to 100° C. and a time of about 1 to 3 hours. The functional group-containing organosilicon resin resulting from this reaction typically has a weight average molecular weight (Mw) of 500 to 5,000, preferably 800 to 2,000, as determined by gel permeation chromatography (GPC) relative to polystyrene standards.

An appropriate amount of the functional group-containing organosilicon resin that covers surfaces of the non-halogen flame retardant particles is 0.1 to 50 parts by weight, more preferably 3 to 10 parts by weight per 100 parts by weight of the non-halogen flame retardant particles. Too less amounts of the resin may lead to poor water resistance or water repellency whereas too much amounts of the resin are sometimes uneconomical.

Surfaces of the non-halogen flame retardant particles can be coated with the functional group-containing organosilicon resin by well-known techniques such as phase separation, drying in liquid, fusion dispersion and cooling, spray drying, and curing in liquid.

The resultant resin-coated non-halogen flame retardant in which non-halogen flame retardant particles are surface coated with a functional group-containing organosilicon resin preferably has an average particle size of 3 to 25 μm, especially 5 to 22 μm. In the practice of the invention, one or more of surface-coated flame retardants may be used.

The synthetic resin emulsion and the resin-coated non-halogen flame retardant in the form of phosphorus and nitrogen-containing non-halogen flame retardant particles surface coated with the functional group-containing organosilicon resin are mixed in such a proportion that 1 to 300 parts by weight, preferably 5 to 200 parts by weight of the non-halogen flame retardant is present per 100 parts by weight of solids of the synthetic resin emulsion. Less than 1 part of the flame retardant provides an insufficient flame retardant effect whereas more than 300 parts of the flame retardant fails to provide a coating with a practical strength and increases the cost.

In addition to the above-mentioned components, the coating composition for vehicle interior materials according to the invention may contain additives, for example, cellulosic water-soluble polymers such as hydroxymethyl cellulose, hydroxyethyl cellulose, carboxymethyl cellulose and methyl cellulose; synthetic water-soluble polymers such as fully saponified polyvinyl alcohol, partially saponified polyvinyl alcohol, polyacrylic acid and salts thereof, polymethacrylic acid and salts thereof, polyacrylamide, and alkali viscosity buildup type acrylic emulsions; bases such as ammonia, triethylamine, and sodium hydroxide; polyethylene wax, anti-foaming agents, leveling agents, tackifiers, preservatives, anti-bacterial agents, and anti-rusting agents as long as they do not compromise the objects of the invention.

The coating composition of the invention is prepared by intimately mixing predetermined amounts of the foregoing components in a conventional manner. The coating composition thus obtained should preferably have a solids content of 30 to 70% by weight, more preferably 40 to 60% by weight.

The coating composition thus obtained is advantageously applicable to various substrates which must be rendered flame retardant, for example, vehicle interior materials such as car seats, floor mats and ceiling members.

In applying the coating composition to substrates, any of well-known applicators, such as gravure roll coaters, knife coaters, and reverse roll coaters may be used. The substrates include woven fabrics and knitted goods of polyester, nylon or the like and non-woven fabrics of polyester, polypropylene or the like.

In applying the coating composition to substrates, the composition may be used as such or after thickening with commercially available thickeners such as alkali viscosity buildup type acrylic emulsions. On use, the coating composition should preferably be adjusted to a viscosity of 10,000 to 50,000 mPa·s at 25° C., more preferably 20,000 to 40,000 mPa·s at 25° C., as measured by a Brookfield viscometer.

The coating weight of the coating composition is generally 30 to 600 g/m², desirably 50 to 500 g/m², in a dry state. After application, the coating is desirably dried at a temperature of about 100 to 180° C. for about 1 to 10 minutes.

The major requirements for automobile interior materials such as car seats, floor mats and ceiling members are not only flame resistance but also texture. The texture is measured by the 45° cantilever method of JIS L1079 as the evaluation of "softness". The performance requirement for "softness" varies according to the kind of automobile interior materials. For car seats and the like, soft texture is required and "softness" according to the 45° cantilever method of JIS L1079 is up to 100. On the other hand, for floor mats, ceiling members and the like, hard texture is required and "softness" according to the 45° cantilever method of JIS L1079 is more than 100. To this end, the coating weight of the coating composition is desirably 30 to 200 g/m$^2$ in a dry state for car seats and the like. The coating weight of the coating composition is desirably 300 to 600 g/m$^2$ in a dry state for floor mats, ceiling members and the like.

EXAMPLE

Preparation Examples (PE), Examples (EX), and Comparative Examples (CE) are given below for further illustrating the invention although the invention is not limited to these Examples. All parts and % are by weight.

Preparation Example 1

A 3-L glass container equipped with a stirrer, reflux condenser and thermometer was thoroughly purged of air with nitrogen. To the glass container were added 1,000 parts of deionized water, 20 parts of Emal O (Kao Co., Ltd., sodium laurylsulfate), and 30 parts of DKSNL-600 (Daiichi Kogyo Seiyaku Co., Ltd., polyoxyethylene lauryl ether). Stirring was started.

The internal temperature of the container was raised to 80° C., whereupon a mixture of 580 parts butyl acrylate, 300 parts ethyl acrylate, 100 parts acrylonitrile and 20 parts acrylic acid was continuously fed over 4 hours and then a mixture of 4 parts ammonium persulfate and 50 parts water continuously fed over 4 hours. Thereafter, reaction was effected at 80° C. for one hour. The reaction solution was cooled to 30° C., yielding an acrylate resin base emulsion having a solids content of 49.5%.

Preparation Examples 2 to 4

Several emulsions were obtained by effecting emulsion polymerization as in Preparation Example 1. The composition of the emulsions of Preparation Examples 1 to 4 and a commercial synthetic resin emulsion is shown in Table 1.

Preparation Example 5

A 500-ml glass container equipped with a stirrer, reflux condenser and thermometer was charged with 85 g (0.37 mol calculated as dimer) of methyltrimethoxysilane oligomer, 154 g of methanol and 5.1 g of acetic acid. With stirring, 6.8 g (0.37 mol) of deionized water was added, followed by 2 hours of stirring at 25° C. Then 17.7 g (0.08 mol) of 3-aminopropyltriethoxysilane was added dropwise.

Thereafter, the container was heated to the reflux temperature of methanol, at which reaction was effected for one hour. Using an ester adapter, the alcohol was distilled off until the internal temperature reached 110° C. There was obtained 81 g of a pale yellow clear solution containing a silicon resin having a Mw of 1,100 as measured by GPC.

To 100 parts of ammonium polyphosphate FR CROS S 10 (by Budenheim, average particle size 8 μm) were added 10 parts of the above reaction solution and 100 parts of ethanol. The mixture was stirred for 30 minutes, and the ethanol was removed under reduced pressure. The residue was ground on a grinder, yielding amino group-containing silicon resin-treated ammonium polyphosphate having an average particle size of 10 μm.

Preparation Example 6

A 500-ml glass container equipped with a stirrer, reflux condenser and thermometer was charged with 199 g (0.88 mol calculated as dimer) of methyltrimethoxysilane oligomer, 120 g of methanol and 11.8 g of acetic acid. With stirring, 19.8 g (0.88 mol of water) of colloidal silica Snowtex O (by Nissan Chemical Co., Ltd.) was added, followed by 2 hours of stirring at 25° C. Then 38.9 g (0.18 mol) of 3-aminopropyltriethoxysilane was added dropwise.

Thereafter, the container was heated to the reflux temperature of methanol, at which reaction was effected for one hour. Using an ester adapter, the alcohol was distilled off until the internal temperature reached 110° C. There was obtained 209 g of a pale yellow clear solution containing a is silicon resin having a Mw of 1,000 as measured by GPC.

To 100 parts of ammonium polyphosphate FR CROS 484 F15 (by Budenheim, average particle size 15 μm) were added 5 parts of the above reaction solution and 100 parts of ethanol. The mixture was stirred for 30 minutes, and the ethanol was removed under reduced pressure. The residue was ground on a grinder, yielding amino group-containing silicon resin-treated ammonium polyphosphate having an average particle size of 17 μm.

Preparation Example 7

To 100 parts of ammonium polyphosphate FR CROS S 10 (by Budenheim, average particle size 8 μm) were added 5 parts of a linear silicone oil KF-96H (by Shin-Etsu Chemical Co., Ltd.) and 100 parts of toluene. The mixture was stirred for 30 minutes, and the toluene was removed under reduced pressure. The residue was ground on a grinder, yielding silicone-treated ammonium polyphosphate having an average particle size of 10 μm.

Examples 1 to 6 and Comparative Examples 1 to 8

To a stainless steel container was added 100 parts of each of the emulsions of Preparation Examples 1 to 4 or a commercial emulsion. Stirring was started. With stirring continued, a predetermined amount of a dispersion liquid (solids 60%) of each of the treated ammonium polyphosphates of Preparation Examples 5 to 7 or commercial ammonium polyphosphate in water with the aid of a surfactant Latemul ASK (by Kao Corp.) was added, followed by one hour of stirring. Thereafter, deionized water was added for adjusting the solids content to 50±1%. Then a thickener Boncoat V (by Dainippon Ink & Chemicals, Inc., alkali viscosity buildup type acrylic emulsion) and 25% aqueous ammonia were added to the dispersion for thickening, yielding a coating composition having an increased viscosity of 30,000±3,000 mPa·s at 25° C. by a Brookfield viscometer. The formulation of these coating compositions is shown in Tables 2 and 3.

A predetermined amount of each coating composition was applied to a commercial polyester woven fabric with a weight of 400 g/m$^2$ and a commercial polypropylene non-woven fabric with a weight of 700 g/m$^2$, and dried at 130° C. for 5 minutes, completing samples.

The samples of Examples and Comparative Examples were examined for sew line fatigue, flame retardance, water resistance, softness, and formaldehyde emission. The samples of polyester woven fabric with a weight of 400 g/m$^2$ were used as car seats and examined for sew line fatigue, flame retardance, water resistance, softness, and formaldehyde emission, with the results shown in Table 4. The samples of polypropylene non-woven fabric with a weight of 700 g/m$^2$ were used as floor mats and examined for flame retardance, water resistance, softness, and formaldehyde emission, with the results shown in Table 5.

The test methods and evaluation criteria are described below.

1. Sew Line Fatigue

Two pairs of pieces of 10 cm wide and 10 cm long were cut out from each of warp and weft directions. To the back surface of each piece, a urethane foam slab (density 0.02 g/cm$^3$, thickness 5 mm) and a backing fabric (nylon spun-bonded fabric, 40 g/m$^2$) of the same size were laid to form a laminate. Two laminates were laid with their front surfaces mated each other. Using a sewing machine, the assembly was sewed at 1 cm inside from the side edge. In this way, two sets of specimens were prepared for each of warp and weft directions. The specimen was mounted on a sew line fatigue testing machine (Yamaguchi Chemical Industry Co., Ltd.) which was operated under a load of 3 kg over 2,500 cycles. With the load of 3 kg kept applied, the sew line fatigue of the specimen was observed through a scale magnifier.

The term "sew line fatigue" refers to the distance between the sewing thread moved in the loading direction by repeated fatigue and the thread within fabric located nearest thereto, measured in unit 0.1 mm. An average of measurements at two locations is the sew line fatigue of the test specimen.

Rating criterion
◯: moving distance≦2.2 mm
X: moving distance>2.2 mm

2. Flame Retardance

Examined by the test method of US Federal Motor Vehicle Safety Standard FMVSS 302.

Rating criterion for car seat
◯: burnt distance≦38 mm
X: burnt distance>38 mm

Rating criterion for floor mat
◯: burnt distance≦38 mm+burning time≦60 sec or burning rate≦10 cm/min
X: burnt distance>38 mm+burning time>60 sec and burning rate>10 cm/min 3. Water Resistance A water droplet having a diameter of 5 mm was dropped on the coated surface of fabric. It was examined whether or not the coated surface became slimy.

Rating criterion
◯: not slimy
Δ: somewhat slimy
X: heavily slimy

4. Softness

Examined by the 45° cantilever method of JIS L1079 (5.17A method). The higher the softness, the harder felt was the sample.

Rating criterion for car seat
◯: softness≦100
X: softness>100

Rating criterion for floor mat
◯: softness>100
X: softness≦100

5. Formaldehyde Emission

A 2-L Tedlar® bag (available for DuPont) was charged with 50 cm$^2$ of a sample, purged with nitrogen and sealed. The Tedlar® bag was held at 65° C. for 2 hours. Using a gas detector 91L (Gas Tech Co., Ltd.), formaldehyde was detected.

Rating criterion
◯: no formaldehyde
X: formaldehyde detected

TABLE 1

| Composition solids (%) | Resin emulsion | | | | | | | |
|---|---|---|---|---|---|---|---|---|
| | St | MMA | BA | EA | AN | AA | GMA | Solids (%) |
| Preparation Example 1 | | | 58 | 30 | 10 | 2 | | 49.5 |
| Preparation Example 2 | | 20 | 72 | | | 5 | 3 | 50.3 |
| Preparation Example 3 | 80 | | 18 | | | 2 | | 50.5 |
| Preparation Example 4 | | 65 | | 32 | | 3 | | 49.8 |
| Hydran HW-301 | urethane resin base emulsion, Dainippon Ink & Chemicals, Inc. | | | | | | | 45 |
| Sumikaflex 752 | ethylene/vinyl acetate resin base emulsion, Sumitomo Chemical Co., Ltd. | | | | | | | 50 |
| Nalstar SR-112 | SER base emulsion, Nippon A&L Inc. | | | | | | | 50 |

St: styrene
MMA: methyl methacrylate
BA: butyl acrylate
EA: ethyl acrylate
AN: acrylonitrile
AA: acrylic acid
GMA: glycidyl methacrylate

TABLE 2

| | Coating composition for car seat | | | | | | | |
|---|---|---|---|---|---|---|---|---|
| Amount of composition, | Example | | | Comparative Example | | | | |
| as solids (pbw) | 1 | 2 | 3 | 1 | 2 | 3 | 4 | 5 |
| Preparation Example 1 | 100 | | | 100 | | 100 | 100 | |
| Preparation Example 2 | | 100 | | | 100 | | | 100 |
| Hydran HW-301 | | | 100 | | | | | |
| Preparation Example 5 | 100 | | 100 | | | | 0.5 | |
| Preparation Example 6 | | 150 | 80 | | | | | 400 |
| Preparation Example 7 | | | | | 150 | | | |
| Terrages C-30 | | | | | | 100 | | |
| Terrages C-60 | | | | | | | 100 | |

Terrages C-30: Chisso Corp., melamine-coated ammonium polyphosphate
Terrages C-60: Chisso Corp., melamine/formaldehyde-coated ammonium polyphosphate

TABLE 3

Coating composition for floor mat

| Amount of composition, as solids (pbw) | Example | | | | Comparative Example | | |
|---|---|---|---|---|---|---|---|
| | 4 | 5 | 6 | 7 | 6 | 7 | 8 |
| Preparation Example 3 | 100 | | 50 | | 100 | | 100 |
| Preparation Example 4 | | 100 | | | | 100 | |
| Sumikaflex 752 | | | 50 | | | | |
| Nalstar SR-112 | | | | 100 | | | |
| Preparation Example 5 | 10 | | 7 | | 10 | | |
| Preparation Example 6 | | 15 | | 5 | | | 0.5 |
| Terrages C-30 | | | | | | 10 | |
| Terrages C-60 | | | | | | | 15 |

TABLE 4

Test results of car seats

| | Example | | | Comparative Example | | | | |
|---|---|---|---|---|---|---|---|---|
| | 1 | 2 | 3 | 1 | 2 | 3 | 4 | 5 |
| Dry coating weight (g/m²) | 130 | 100 | 80 | 110 | 100 | 150 | 150 | 100 |
| Sew line fatigue | ○ | ○ | ○ | ○ | ○ | ○ | ○ | X |
| Flame retardance | ○ | ○ | ○ | ○ | ○ | ○ | X | ○ |
| Water resistance | ○ | ○ | ○ | Δ-X | Δ-X | ○ | ○ | ○ |
| Softness | ○ | ○ | ○ | ○ | ○ | ○ | ○ | ○ |
| Formaldehyde | ○ | ○ | ○ | ○ | ○ | X | ○ | ○ |

TABLE 5

Test results of floor mats

| | Example | | | | Comparative Example | | |
|---|---|---|---|---|---|---|---|
| | 4 | 5 | 6 | 7 | 6 | 7 | 8 |
| Dry coating weight (g/m²) | 350 | 400 | 380 | 450 | 420 | 430 | 450 |
| Flame retardance | ○ | ○ | ○ | ○ | ○ | ○ | X |
| Water resistance | ○ | ○ | ○ | ○ | Δ-X | ○ | ○ |
| Softness | ○ | ○ | ○ | ○ | ○ | ○ | ○ |
| Formaldehyde | ○ | ○ | ○ | ○ | ○ | X | ○ |

There have been described coating compositions which are advantageously applicable to motor vehicle interior materials such as car seats, floor mats and ceiling members for rendering them flame retardant.

Japanese Patent Application No. 2004-175119 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A coating composition for vehicle interior materials, comprising a synthetic resin emulsion and at least one non-halogen flame retardant in which phosphorus and nitrogen-containing non-halogen flame retardant particles are surface coated with a functional group-containing organosilicon resin, said synthetic resin emulsion being selected from the group consisting of (meth)acrylate resin base emulsions, styrene/acrylate copolymer base emulsions, ethylene/vinyl acetate copolymer base emulsions, and mixtures thereof, said phosphorus and nitrogen-containing non-halogen flame retardant particle being at least one member selected from the group consisting of guanidine phosphates, ammonium phosphates, and ammonium polyphosphates, said functional group-containing organosilicon resin is the reaction product of a siloxane oligomer which is a partial hydrolytic condensate of at least one alkoxysilane having the formula:

$$R_nSi(OR')_{4-n}$$

wherein R is a monovalent hydrocarbon group, R' is $C_1$-$C_4$ alkyl, and n is an integer of 0 to 3, the condensate containing at least one alkoxy group and having 2 to 10 silicon atoms on the average, with a functional group-containing organosilicon compound which is a functional group-containing alkoxysilane having the formula:

$$X_mR_kSi(OR')_{4-m-k}$$

wherein X is an alkyl group having a functional group selected from the group consisting of epoxy, vinyl, mercapto, carboxyl, and amino, R is a monovalent hydrocarbon group, R' is $C_1$-$C_4$ alkyl, m is 1, 2, or 3, k is 0, 1, or 2, and m+k is 1, 2, or 3, or a partial hydrolyzate thereof, and a bis(alkoxysilyl) group-containing compound or a partial hydrolyzate thereof, said at least one non-halogen flame retardant being added in an amount of 1 to 300 parts by weight per 100 parts by weight of solids of the synthetic resin emulsion, and said bis(alkoxysilyl) group-containing compound or partial hydrolyzate thereof being added in an amount of 0.1 to 20 parts by weight per 100 parts by weight of the siloxane oligomer.

2. The coating composition of claim 1, wherein said phosphorus and nitrogen-containing non-halogen flame retardant particle is an ammonium polyphosphate.

3. The coating composition of claim 1, wherein the alkoxysilane contains at least 50% by weight of a trialkoxysilane.

4. The coating composition of claim 1, wherein said siloxane oligomer is one obtained by reacting a $C_1$-$C_6$ alkyltrichlorosilane with methanol or ethanol and has 2 to 6 silicon atoms on the average.

5. The coating composition of claim 1, wherein said functional group is an amino group.

6. The coating composition of claim 1, wherein the functional group-containing organosilicon compound is used in an amount of 0.5 to 50 parts by weight per 100 parts by weight of the siloxane oligomer.

7. The coating composition of claim 1, wherein the reaction is conducted at about 60 to 100° C. for about 1 to 3 hours.

8. The coating composition of claim 1, wherein the functional group-containing organosilicon resin has a weight average molecular weight of 500 to 5,000.

9. The coating composition of claim 1, wherein the resin-coated non-halogen flame retardant has an average particle size of 3 to 25 μm.

10. The coating composition of claim 1, wherein 0.1 to 10 parts by weight of inorganic oxide fine particles is added per 100 parts by weight of the siloxane oligomer.

11. A coating composition for vehicle interior materials, comprising:

a synthetic resin emulsion and at least one non-halogen flame retardant in which phosphorus and nitrogen-containing non-halogen flame retardant particles are surface coated with a functional group-containing organosilicon resin, said synthetic resin emulsion being selected from the group consisting of (meth)acrylate resin base emulsions, styrene/acrylate copolymer base emulsions, ethylene/vinyl acetate copolymer base emulsions, and mixtures thereof, said phosphorus and nitrogen-containing non-halogen flame retardant particle being at least one member selected from the group consisting of guanidine phosphates, ammonium phosphates, melamine phosphates, and ammonium polyphosphates, said functional group-containing organosilicon resin is the reaction product of a siloxane oligomer which is a partial hydrolytic condensate of at least one alkoxysilane having the formula:

$$R_nSi(OR')_{4-n}$$

wherein R is a monovalent hydrocarbon group, R' is $C_1$-$C_4$ alkyl, and n is an integer of 0 to 3, the condensate containing at least one alkoxy group and having 2 to 10 silicon atoms on the average, with a functional group-containing organosilicon compound which is a functional group-containing alkoxysilane having the formula:

$$X_mR_kSi(OR')_{4-m-k}$$

wherein X is an alkyl group having a functional group selected from the group consisting of epoxy, vinyl, mercapto, carboxyl, and amino, R is a monovalent hydrocarbon group, R' is $C_1$-$C_4$ alkyl, m is 1, 2, or 3, k is 0, 1, or 2, and m+k is 1, 2, or 3, or a partial hydrolyzate thereof, and a bis(alkoxysilyl) group-containing compound or a partial hydrolyzate thereof, said at least one non-halogen flame retardant being added in an amount of 1 to 300 parts by weight per 100 parts by weight of solids of the synthetic resin emulsion, and said inorganic oxide particles being added in an amount of 0.1 to 10 parts by weight per 100 parts by weight of the siloxane oligomer.

* * * * *